United States Patent [19]
Chen

[11] Patent Number: 5,301,963
[45] Date of Patent: Apr. 12, 1994

[54] CONVERTIBLE STROLLER

[75] Inventor: Chen-Yuan Chen, El Centro, Calif.

[73] Assignee: Motiv Sports Inc., Yorba Linda, Calif.

[21] Appl. No.: 715,859

[22] Filed: Jun. 12, 1991

[51] Int. Cl.[5] .............................................. B62B 3/02
[52] U.S. Cl. .................................. 280/30; 280/32.7; 280/204; 280/643; 280/658; 280/415.1
[58] Field of Search ................ 280/30, 31, 32.7, 400, 280/415.1, 47.131, 47.38, 62, 204, 658, 642, 643, 644, 645

[56] References Cited

U.S. PATENT DOCUMENTS

| | | |
|---|---|---|
| D. 204,254 | 4/1966 | Cerf . |
| D. 274,714 | 7/1984 | Cone . |
| D. 297,525 | 9/1988 | Baechler ........................ D12/129 |
| 2,781,225 | 2/1957 | Heideman ......................... 296/26 |
| 3,421,774 | 1/1969 | Patterson ........................ 280/642 |
| 3,873,115 | 3/1976 | Perego . |
| 4,042,274 | 8/1977 | Cabagnero ....................... 296/1 B |
| 4,072,318 | 2/1978 | Laune ............................. 280/42 |
| 4,181,317 | 1/1980 | Toda .............................. 280/42 |
| 4,335,900 | 6/1982 | Fleischer ......................... 280/401 |
| 4,373,740 | 2/1983 | Hendrix .......................... 280/269 |
| 4,403,673 | 9/1983 | Ball .............................. 180/214 |
| 4,408,776 | 10/1983 | Randolph ........................ 280/261 |
| 4,411,472 | 10/1983 | Kassai ............................ 297/430 |
| 4,413,835 | 11/1983 | Hazelett ......................... 280/204 |
| 4,479,665 | 10/1984 | Kassai ............................ 280/644 |
| 4,506,906 | 3/1985 | Allden ............................ 280/642 |
| 4,565,388 | 1/1986 | Kassai ............................ 280/644 |
| 4,591,175 | 5/1986 | Kassai ............................ 280/47.36 |
| 4,618,184 | 10/1986 | Harvey ........................... 297/19 |
| 4,681,340 | 7/1987 | Pasquini ......................... 280/642 |
| 4,732,406 | 3/1988 | Kassai ............................ 280/642 |
| 4,809,724 | 3/1989 | Fuser ............................. 135/16 |
| 4,813,664 | 3/1989 | Vroulis .......................... 272/70.3 |
| 4,819,958 | 4/1989 | Perego ........................... 280/644 |
| 4,848,780 | 7/1989 | Straub ............................ 280/15 |
| 4,883,283 | 11/1989 | Hazelett et al. .................. 280/204 |
| 4,902,027 | 1/1990 | Skelly ............................ 280/33.998 |
| 4,934,728 | 6/1990 | Chen .............................. 280/644 |
| 4,953,880 | 9/1990 | Sudakoff ......................... 280/47.38 |
| 5,020,813 | 6/1991 | Gottschalk ...................... 280/204 |
| 5,029,891 | 7/1991 | Jacobs . | |
| 5,076,599 | 12/1991 | Lockett et al. ................... 280/62 |

FOREIGN PATENT DOCUMENTS 2579544 3/1985 France .
2204382 11/1988 United Kingdom .

Primary Examiner—Richard M. Camby
Attorney, Agent, or Firm—Richard L. Myers

[57] ABSTRACT

A convertible child carriage includes a base frame assembly having a pair of wheels rotatably attached to a base frame and means for supporting the child in the carriage. A front wheel assembly and a tow bar assembly are alternatively attachable to a coupling which provides for the pivotal rotation of the front wheel assembly into a collapsed configuration with the base assembly.

16 Claims, 4 Drawing Sheets

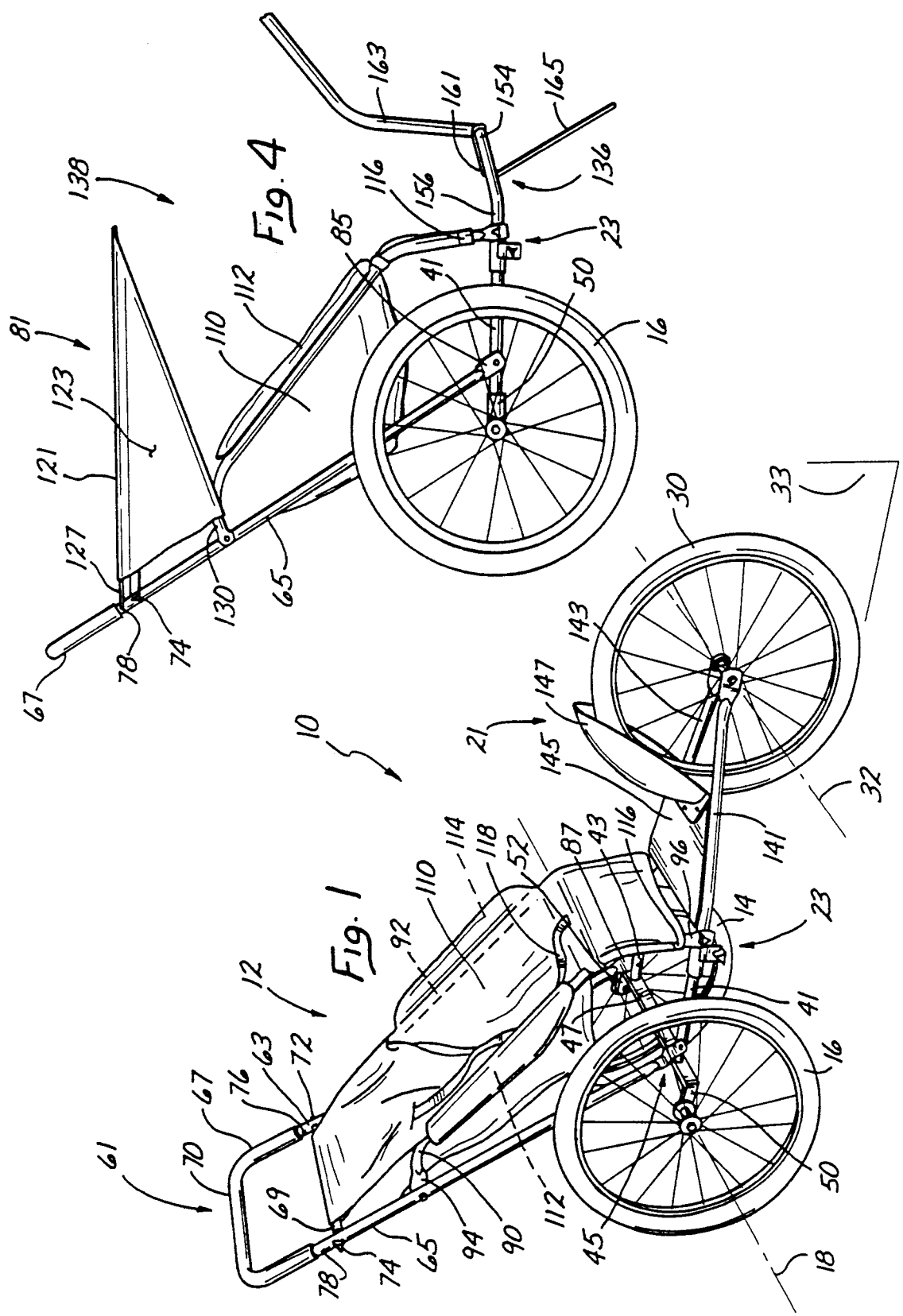

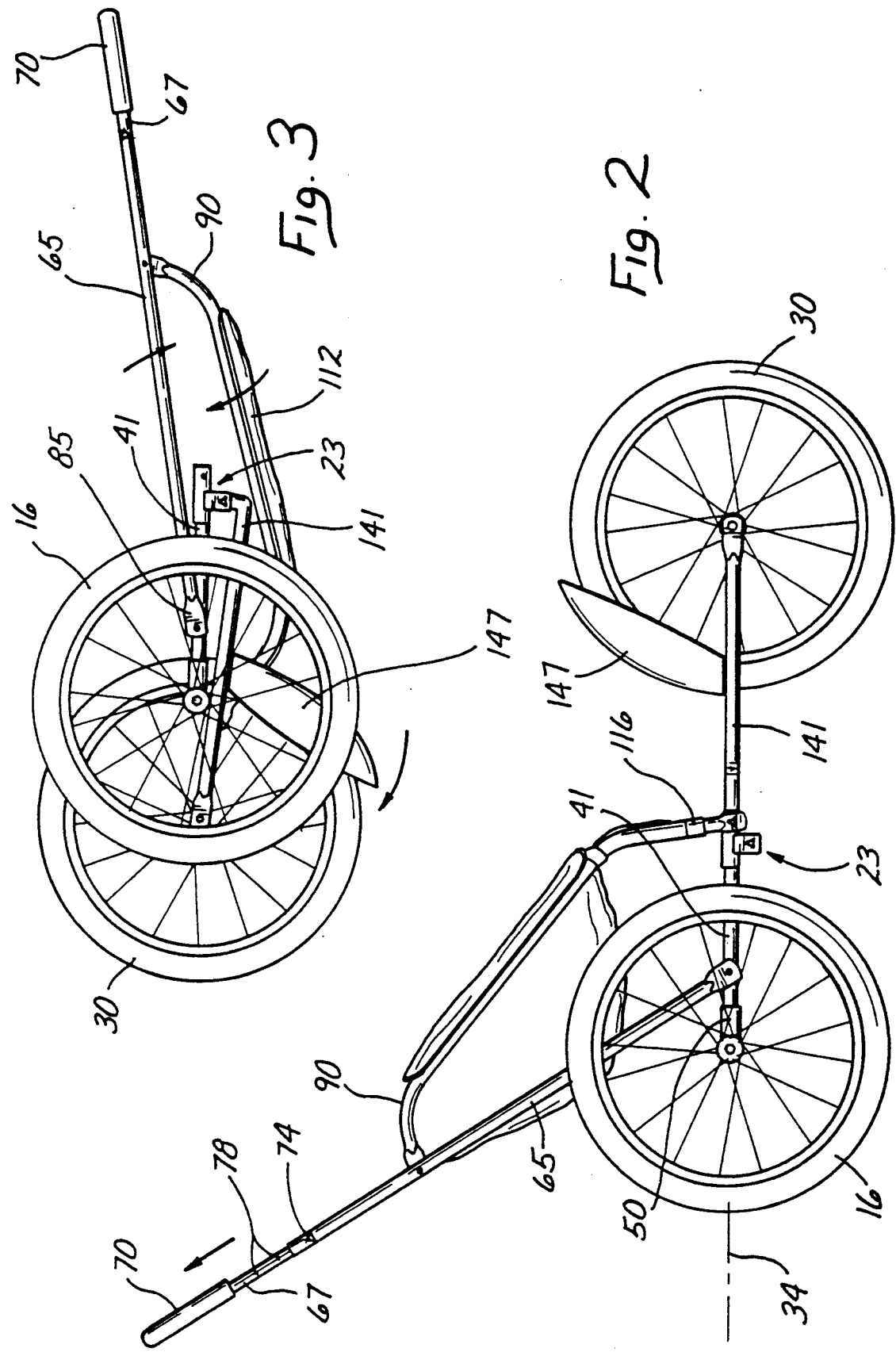

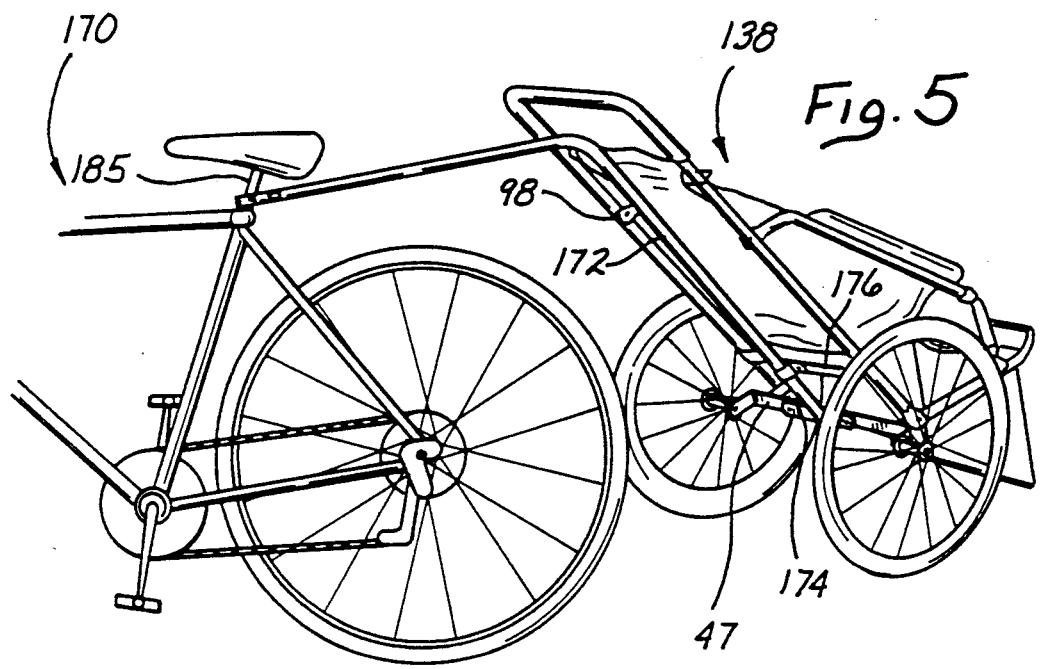
Fig. 5
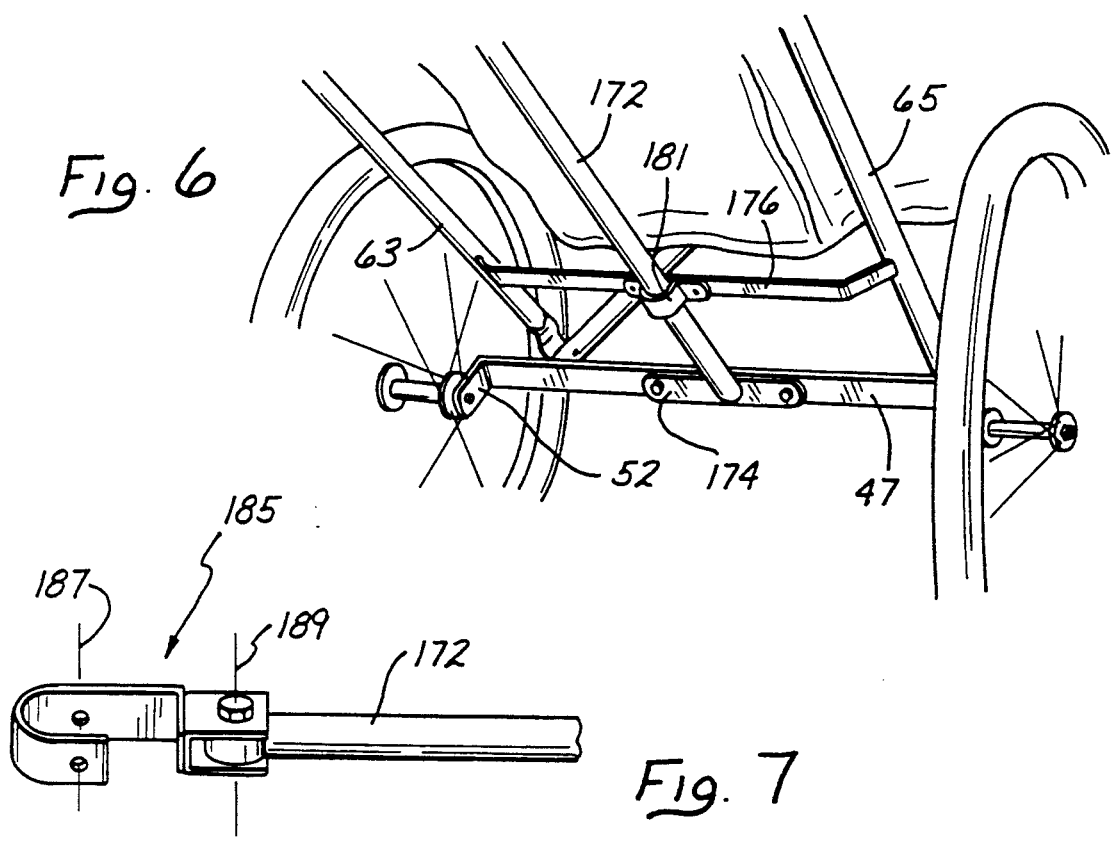
Fig. 6
Fig. 7

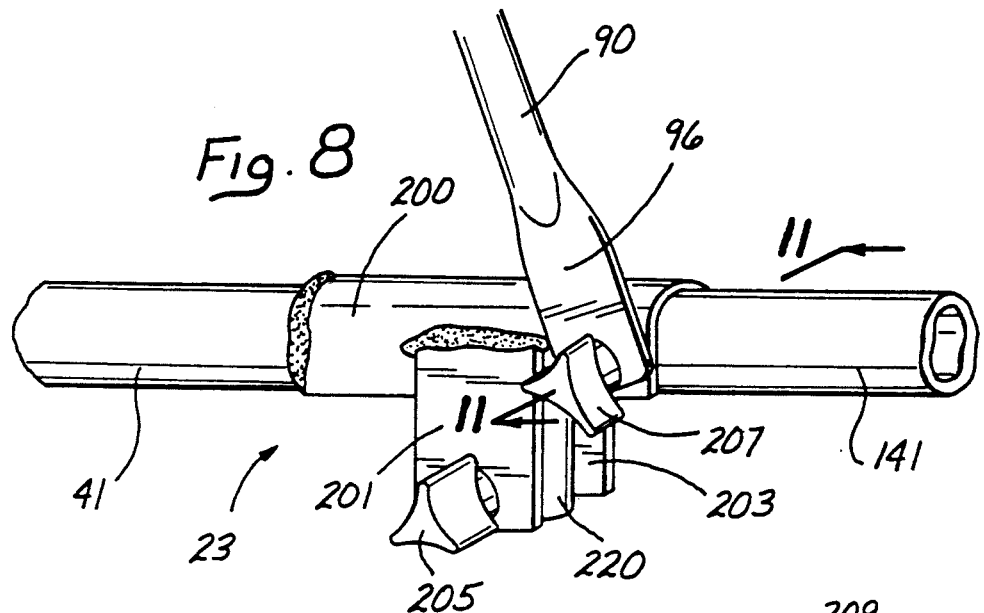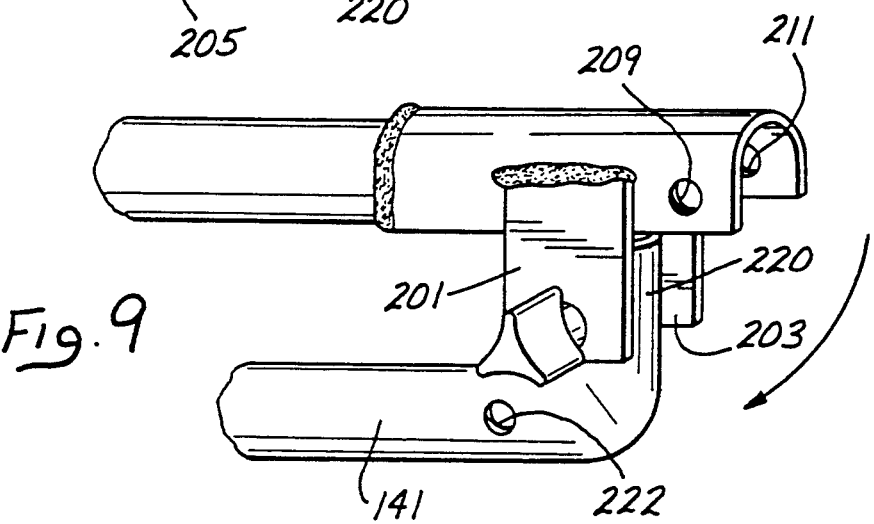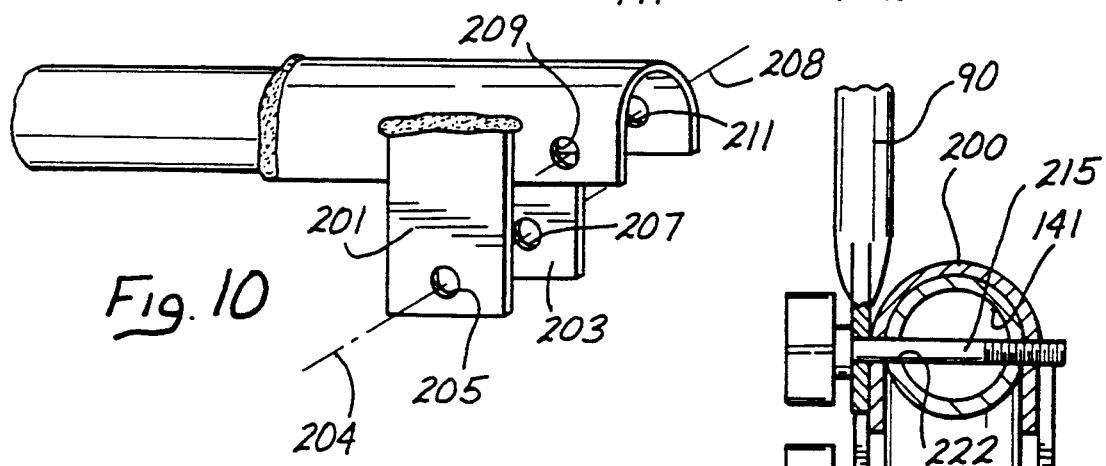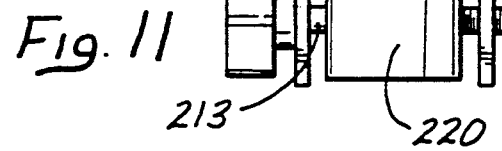

CONVERTIBLE STROLLER

BACKGROUND OF THE INVENTION

1. Field of the Invention

This invention relates generally to child carriages including baby carriages and strollers and child carts all of which are propelled by an adult walking, running or riding another vehicle.

2. Discussion of Prior Art

With an increasing interest in physical fitness, adults are spending more time out-of-doors walking, running, riding bicycles and otherwise exercising. This can be an enjoyable activity which is fun to share with children. Unfortunately, however, children typically cannot maintain the same level of exercise as an adult, so child carriages have become increasingly popular. These carriages have typically taken the form of three-wheeled jogging strollers and two-wheeled carts which are towable by bicycles.

These carriages are typically larger than a conventional baby carriage primarily to provide increased stability at the higher speeds typically associated with jogging or bicycle riding. For this reason, a three-wheel jogging stroller is commonly provided with an elongate wheel base and a generally wider wheel track.

These increased dimensions make it difficult to transport such carriages, for example, when a family drives an automobile to a distant location to jog or ride bicycles. In such a case it would be beneficial if the carriage were collapsible to a size that could fit into the conventional trunk of an automobile. Where this has not been possible, the carriages have been towed on the top of an automobile or a larger vehicle, such as a van, has been required. Thus it has become increasingly desirable to provide a carriage which can fold into a compact configuration more suitable for conventional transport. A carriage which can also be inexpensively and easily converted between a jogging stroller and a towable bicycle cart would be of particular interest.

SUMMARY OF THE INVENTION

In accordance with the present invention, a base frame assembly is provided with two wheels aligned on a common axis, a handle, and a seat support. This base frame assembly is also provided with a special coupling mechanism which is adapted to receive either a front wheel assembly or a tow bar assembly. When the front wheel assembly is attached, the carriage forms a three-wheeled jogging stroller which can be easily collapsed without total disassembly, in order to facilitate transporting the stroller.

When the tow bar assembly is attached to the base frame assembly, the carriage forms a two-wheeled cart which is towable by a bicycle with the child facing in the forward direction. In an alternate embodiment, a tow bar assembly can be provided to support the child facing is a rearward direction. In both cases, the cart can be easily collapsed to a more compact configuration to facilitate its transportability.

These and other features and advantages of the invention will be more apparent with a description of the preferred embodiments and reference to the associated drawings.

DESCRIPTION OF THE DRAWINGS

FIG. 1 is a perspective view of one embodiment of a threewheeled jogging stroller associated with the present invention and illustrating a base frame assembly and an attached front wheel assembly;

FIG. 2 is a side elevation view of the three-wheeled jogging stroller illustrated in FIG. 1;

FIG. 3 is a perspective view of the stroller in a collapsed configuration with the front wheel assembly pivoted on a coupling;

FIG. 4 is a side elevation view of a towable child cart including the base frame assembly and an attachable tow bar assembly which is oriented to face a child in the forward direction;

FIG. 5 is a perspective view of a towable child cart with a tow bar which is oriented to face the child in the rearward direction;

FIG. 6 is a perspective view of the attachment mechanism associated with the tow bar of FIG. 5;

FIG. 7 is a perspective view of a universal clamp for attaching the tow bar to a bicycle;

FIG. 8 is an enlarged perspective view of a preferred coupling associated with the present invention;

FIG. 9 is a perspective view of the coupling of FIG. 8 illustrating the front wheel assembly in its collapsed position as illustrated in FIG. 3;

FIG. 10 is a perspective view of a sleeve and flange structure associated with the coupling of FIG. 8; and FIG. 11 is a radial cross-section view of the coupling taken along lines 11—11 of FIG. 8.

DESCRIPTION OF PREFERRED EMBODIMENTS

A child carriage or jogging stroller is illustrated in FIG. 1 and designated generally by the reference numeral 10. This stroller 10 includes a base frame assembly 12 having two large wheels 14 and 16 disposed in separate vertical planes and aligned on a common axis 18. The stroller 10 also includes a front wheel assembly 10 which is removably and pivotally attached to the base frame assembly 12 by a coupling 23. The front wheel assembly 30 include a front wheel 25 which rotates on an axis 32 and is disposed in a medial plane 33 which extends vertically and equidistant between the wheels 14, 16.

The stroller 10, including the base assembly 12 and the wheel assembly 30, is generally symmetrical about the median plane 33. In the following discussion where various structural elements of the stroller 10 are described on one side, it will be understood that the same part is duplicated in a mirror image, on the opposite side of the median plane 33. In addition to this medial plane 33, the stroller 10 is .characterized by a base plane 34 (best shown in FIG 2) which includes both the common axis 18 and the front wheel axis 32.

The stroller 10 is of generally tubular construction except as noted. The tubes are typically formed from steel which can be bent, painted, drilled, and threaded. The steel tubes can also be stamped to form end flanges in a conventional manner.

The base frame assembly 12 includes two base bars 41 and 43 which are attached at one end to the couplings 23 on either side of the stroller 10. The opposite ends of the base bars 41, 43 are welded or otherwise fixed to an angle brace 45 which supports the wheels 14, 16. In order to enhance the rigidity of this structure, the brace 45 may be formed from rectangular bar stock having cross-sectional dimensions such as one-quarter inch and three-quarters inch.

The angle brace 45 includes a cross member 47 and two end flanges 50, 52 which are disposed generally in the base plane 34 along with the base bars 41, 43. The cross member 47 extending generally perpendicular to the base bars 41, 43 and the end flanges 50, 52. Each of the wheels 14, 16 has a stub axle which is bolted directly to an associated one of the end flanges 52, 50.

The base frame assembly 12 also includes a handle 61 which is attached to the base bars 41, 43. The handle 61 includes two elongate tubes 63, 65 which are interconnected by a "U-shaped" grip bar 67 and a cross bar 69. The grip bar 67 is configured to telescope into the upper ends of the tubes 63, 65 and may be provided with a sponge rubber sleeve or grip 70. The cross bar 69 can be welded to the tubes 65, 63 or alternatively plugged, drilled and threaded to receive elongate screws 72, 74 through the tubes 63, 65, respectively. In a preferred embodiment, the handle 61 is adjustable in height. The grip bar 67 is drilled to form two series of holes 76 and 78 each of which can be engaged by the respective pins 72, 74 to provide a desired height for the handle 61.

At the bottom of the handle 61, the tubes 63, 65 are stamped to form flanges 85, 87 respectively. These flanges 85, 87 are preferably bolted to the respective base bars 41, 43 at the respective couplings 23.

A pair of seat support bars 92, 94 are of particular importance to the present invention. Both of these bars 90, 92 are stamped to form flanges at each end. Thus the seat support bar 90 is provided with a flange 94 at its upper end and a flange 96 at its lower end. Similarly the bar 92 is provided with a flange 98 (FIG. 5) at its upper end and a flange (not shown) at its lower end. In a preferred embodiment, the flange 94 is bolted to the elongate tube 65 associated with the handle 61. The flange 96 is bolted to the coupling 23 in a manner described in greater detail below.

With its rigid attachment to the handle 61 and the coupling 23, the seat support bar 90 provides means for maintaining the handle 61 at a fixed angle with respect to the base plane 34. In a particular embodiment, a series of holes (not shown) could be provided in either the flange 94 or the flange 96 to provide for adjustment in this angle between the handle 61 and the plane 34.

It is of particular advantage that the seat support bar 90 is releasably attached at one of its ends, such as the end including the flange 96, in order to permit the handle 61 to pivot forwardly and downwardly into the collapsed position illustrated in FIG. 3.

Of course it is a primary purpose of the bars 90, 92 to provide means for supporting a canvas seat 110 for the child (not shown). Large planar flanges 112, 114 can be attached to the respective bars 90, 92 to extend generally beyond the respective wheels 16, 14. These flanges 112, 114 receive portions of the child's seat 112 and function as fenders to separate arms and legs from the rotating wheels 14, 16. While the flanges 112, 114 support the central regions of the seat 11, the upper regions of the seat 110 can be looped around the cross bar 69 associated with the handle 61. The lower regions of the seat 110 can be attached to the bottom portions of the bars 90, 92 for example with lock and loop straps 116. A seat belt 118 may also be provided for protection.

A canopy 81 can also be formed from canvas and color coordinated with the seat 110. The canopy 81 includes a top 121 and a pair of side flaps 123. The top 121 is supported by a wire frame 127 which extends around the perimeter of the top 121 and engages the holes 76 and 78 associated with the grip bar 67. The side flaps 123 extend down from the wire frame 127 and are held in place by a bar 130 which can be bolted with the seat support bar 90 to the elongate tube 65. For structural rigidity, the wire frame 127 and the bar 130 can be welded to form a triangle with the tube 65.

With a pending detailed discussion of the coupling 23, this completes the base frame assembly 12 in a preferred embodiment of the invention. With the attachment of the front wheel assembly 21 the base assembly 12 becomes the three-wheeled stroller 10 as illustrated in FIG. 1. With the alternative attachment of a tow bar assembly 136, the base assembly 12 becomes a tow cart illustrated generally and designated by the reference numeral 138 in FIG. 4.

The front wheel assembly 21 includes side bars 141, 143 which extend from the couplings 23 forwardly as they converge toward the medial plane 33. At their forward ends, the bars 141 are flanged and spaced sufficiently to receive the front wheel 30 in a conventional manner. A foot platform 145 can be supported by the side bars 141, 143. In a preferred embodiment, a front fender 147 is disposed between the wheel 30 and the seat 110, and is attached to the platform 145 by screws, bolts or the like.

The tow cart 138 illustrated in FIG. 4 includes the same base frame assembly 12 but the tow bar assembly 136 is attached to the couplings 23 in place of the front wheel assembly 21. The tow bar assembly 136 includes a U-shaped tube 152 having a cross member 154 which extends between two side members 156 and 158. These side members 156 158 are aligned to register respectively with the couplings 23, 24. A foot platform 161 can be welded to the tube 152.

In a preferred embodiment, wherein the child faces in the forward direction, a tow bar 163 can be welded, bolted or otherwise attached centrally of the cross member 154. This tow bar 163 extends upwardly and forwardly for attachment to a bicycle as discussed in greater detail below. A pivotal kick stand 165 may also be provided in order to make the cart 138 self-supporting when it is not attached to a bicycle.

In an alternate embodiment illustrated in FIGS. 5 and 6, the cart 138 can be configured for towing behind a bicycle 170 with the child oriented to face in a rearward direction. In this case, a tow bar 172 is provided with a cross member 174 which is adapted to be bolted to the cross member 47 associated with the angle brace 45. For added rigidity, a cross piece 178 can be welded between the elongate tubes 63, 65, and the tow bar 172 can be fixed to the cross piece 178 by a clamp 181.

With reference to the embodiments of FIG. 5, it will be apparent that both the tow bars 163 (FIG. 4) and 172 must extend upwardly a distance sufficient to clear the rear wheel of the bicycle 170. They must also extend sufficiently from the cart 138 in order to engage some rigid member of the bicycle 170 such as a seat bar 185 illustrated in FIG. 5. A universal connector 187, best illustrated in FIG. 7, should be provided for attaching the tow bar 163 or 172 to the bicycle 170. Such a connector must provide for rotation in at least two directions in order that the bicycle can turn and bank without tipping the cart 138. In FIG. 7, the universal connector 185 pivots on both a horizontal axis 187 and a vertical axis 189.

Fundamental to all of these preferred embodiments is the coupling 23 which is shown in greater detail in FIGS. 8-11 The coupling 23 includes an elongate channel member 200 which is generally U-shaped in cross section. The channel member 200 is curved with an inside diameter sufficiently large to receive the base bar 41 of the base frame assembly 12. The opening of the U-shaped channel member 200 faces downwardly in the illustrated embodiment. In this same direction an outer flange 201 and an inner flange 203 extend beyond the sides of the channel member 200. These flanges 201, 203 can be formed integral with the channel member 200 or can be formed separately and welded to the member 200.

As best illustrated in FIG. 10, the outer flange 200 and the inner flange 203 can be horizontally drilled along a common axis 204 to form an outer hole 205 and an inner flange 207. Similarly the channel member 200 can be horizontally drilled on a common axis 208 to form an outer hole 209 and an inner hole 211. In a preferred embodiment, both of the inner holes 207 and 211 are threaded. These hole 205-211 are adapted to receive a pair of pins 213 and 215 best shown in FIG. 11. These pins 213, 215 are provided with threads which are complimentary to those of the respective holes 207 and 211. In a preferred embodiment, the holes 209 and 211 are disposed generally on the base plane 34 (FIG. 2). The holes 205 and 207 are disposed along the common axis 204 which is parallel to but removed from the base plane 24. In a preferred embodiment, the axes 204 and 208 are generally parallel.

With this configuration for the coupling 23, the wheel assembly 21 can be provided in a manner facilitating the pivotal collapse of the wheel assembly 21 as illustrated in FIG. 3. Alternatively, the entire wheel assembly 21 can be removed in favor of the tow bar assembly 136. In order to accomplish this dual purpose, the side bar 141 of the wheel assembly 21, can be provided with a stub 220 at the end which is inserted into the coupling 23. This stub 220 extends downward in a preferred embodiment between the flanges 201 and 203. In this case, the stub 220 is disposed at an angle such as 90° to the side bar 141 and the base plane 34.

A hole 222 can be drilled through the side bar 141 to receive the pin 215. A similar hole can be drilled through the stub 220 to receive the pin 205. When the wheel assembly 21 is thus mounted in the coupling 23, the base bar 41 is fixed to the side bar 141 to form a rigid frame between the base assembly 12 and the wheel assembly 21.

In order to accommodate the collapse of the stroller 10, the pin 215 is initially removed. This permits the side bar 141 to pivot downwardly through the opening in the channel member 200. The front wheel 30 pivots downwardly and backwardly rotating on the pin 213 and around the axis 204. With the pin 213 offset from the base plane 34, the side bar 141 can be rotated into a generally parallel, underlying relationship with the base bar 41 as illustrated in FIG. 3. With this simple maneuver, the size of the stroller is greatly reduced making it quite simple to transport the stroller 10 in the trunk of a conventional automobile.

Alternatively, both of the pins 213 and 215 can be withdrawn to permit the complete removal of the wheel assembly 21. In this state the couplings 23 are adapted to receive the side members 156 associated with the tow bar assembly 136. By merely replacing the pins 213 and 215, the tow bar assembly 136 can be held in a rigid relationship with the base frame assembly 12 to facilitate towing of the cart 138.

Although the invention has been described with reference to specific preferred embodiments, it will be apparent that various aspects of these embodiments can be changed all within the scope of the invention. For example, in a particular embodiment, it may be desirable to collapse the stroller 10 by rotating the front wheel assembly 21 upwardly and backwardly relative to the base plane 34. In such a case, the coupling 23 would be rotated 180° along with the stub 220 associated with the side bar 141. Thus, the opening of the channel member 200, as well as the flanges 201, 203 and the stub 220 would all extend upwardly. This arrangement would still require removal of the pin 215 in the base plane 34 and rotation about the pin 2 3 which is removed from the base plane 34.

Other variations might include a front wheel assembly 21 including more than one front wheel. In a particular embodiment, the seat support bars 90, 92 could be oriented to position the child facing rearwardly in the stroller 10. The cross member 47 associated with the base frame assembly 12 could also be configured to receive a full axle for supporting the wheels 14 and 16.

It is due to these wide variations in the concept of the invention that tne scope of the invention should not be determined from the details of the described embodiments, but rather should be ascertained with reference to the following claims.

I claim:

1. A carriage for a child, including:
a base assembly having a medial plane;
a base frame included in the base assembly;
at least a pair of wheels rotatably attached to the base frame;
means for supporting the child in the carriage;
a front wheel assembly adapted to be coupled to the base assembly with the front wheel assembly generally symmetrical about the medial plane;
a front wheel frame included in the front wheel assembly;
at least one wheel rotatably attached to the front frame;
a tow bar assembly adapted to be coupled to the base assembly with the tow bar assembly being generally symmetrical about the medial plane;
a tow bar frame included in the tow bar assembly;
a tow bar attached to the tow bar frame; and
coupling means having a fixed relationship with the base frame for alternatively attaching one of the front wheel assembly and the tow bar assembly to the base assembly.

2. The carriage recited in claim 1 further comprising:
a foot platform fixed to the front frame of the front frame assembly.

3. A carriage for a child, including:
a base assembly;
a base frame included in the base assembly;
at least a pair of wheel included in the base assembly and rotatably attached to the base frame;
means included in the base assembly for supporting the child in the carriage;
a front wheel assembly;
a front frame included in the front wheel assembly and having a pair of side bars converging to a wheel support;
a single wheel included in the front wheel assembly and rotatably attached to the front frame at the wheel support;
coupling means for detachably coupling the front wheel assembly to the base frame assembly;

means included in the coupling means for pivotally attaching the front wheel assembly to the base assembly to permit pivotal movement of the front wheel between an operating position wherein the front wheel assembly extends from the base frame, and a collapsed position wherein the front wheel assembly is disposed in juxtaposition to the base frame;

the base frame being disposed generally in a first plane; and the coupling means including a pair of flanges extending transverse to the first plane and a pin extending between the flanges to pivotally attaching the front frame to the base frame.

4. The carriage recited in claim 3 wherein the pin extends in other than the first plane.

5. The carriage recited in claim 4 wherein the pin extends generally parallel to the first plane.

6. The carriage recited in claim 4 further comprising:
a first pair of support members included in the base frame and disposed generally in a first plane;
a second pair of support members included in the front wheel frame and disposed generally in a second plane; and
the first plane and the second plane being generally parallel when the front wheel assembly is in the operative position.

7. The carriage recited in claim 6 wherein the first plane is common with the second plane when the front wheel assembly is in the operative position.

8. A carriage for a child, including:
a base assembly;
a base frame included in the base assembly and having a first support member and a second support member;
at least a pair of wheels rotatably attached to the base frame;
means for supporting the child in the carriage;
a front wheel assembly;
a front frame included in the front wheel assembly and having a first support bar and a second support bar;
at least one wheel rotatably attached to the front frame; and coupling means independently detachably coupling the first support member to the first support bar and the second support member to the second support bar,
said coupling means further including means for pivotally attaching the front wheel assembly of the base assembly to permit pivotal movement of the front wheel assembly between an operating position wherein the front wheel assembly is disposed in an extended relationship to the base frame, and a collapsed position wherein the front wheel assembly is disposed in a juxtaposed relationship to the base frame; and
the first and second support members of the base frame being disposed generally in a first plane and the first and second support bars of the front frame in the operating position being disposed generally to the first plane.

9. The carriage recited in claim 8 wherein the attaching means includes a pair of flanges extending transverse to the first plane and a pin extending through the front frame and between the flanges for pivotally attaching the front frame to the base frame.

10. A carriage for a child including:
a base frame;
at least one wheel rotatably attached to the base frame;
a front frame;
at least one wheel rotatably attached to the front frame;
a handle coupled to the base frame and extending transverse to the base frame;
at least one arm support extending between the handle and the base frame; and
means for coupling the arm support and the front frame to the base frame; and
a single pin included in the coupling means and extending through the arm support, the front frame, and the base frame.

11. The carriage recited in claim 10 wherein the coupling means includes a first flange attached to the base frame and including portions defining a first hole;
a second flange attached to the base frame and including portions defining a second hole;
a first flange and the second flange being spaced to receive the front frame with the single pin disposed to extend through the first hole, the front frame, and the second hole.

12. The carriage recited in claim 11 wherein the arm support includes a third flange having portions defining a third hole and the single pin extends through the third hole.

13. The carriage recited in claim 11 wherein the base frame is disposed generally in a first plane and the first and second flanges extend transverse to the first plane.

14. A carriage for a child, comprising:
a base frame having a medial plane;
at least a pair of wheel fixedly attached to the base frame and in rotatable relationship with the base frame;
means attached to the base frame for supporting the child in the carriage;
a front wheel adapted to be coupled to the base frame;
a tow bar extending in the medial plane of the base frame and adapted to be coupled thereto; and
coupling means for alternatively attaching one of the front wheel and the tow bar to the base frame,
said coupling means including means operable to permit pivoting of the front wheel from an operable position wherein the front wheel is extended from the base frame, to a collapsed position wherein the front wheel is disposed in juxtaposition to the base frame.

15. A carriage for a child, including:
a base assembly;
a base frame included in the base assembly;
a handle pivotal on the base frame of the base frame assembly between an operable position and a collapsed position;
at least a pair of rotatably attached to the base frame;
means for supporting the child in the carriage;
a front wheel assembly;
a front wheel frame include din the front wheel assembly;
at least one wheel rotatably attached to the front frame;
a tow bar assembly;
a tow bar frame included in the tow bar assembly;
a tow bar attached to the tow bar frame; and
coupling means for alternatively attaching one of the front wheel assembly and the tow bar assembly to the base assembly; and means included in the coupling means for permitting the rotation of the front wheel assembly from an operable position wherein the front wheel assembly is extended from the base assembly, to a collapsed position wherein the front wheel assembly is disposed in juxtaposition to the base assembly.

16. A carriage for a child, comprising:

a base frame at least a pair of wheels fixedly attached to the base frame and in rotatable relationship with the base frame;

means attached to the base frame for supporting the child in the carriage;

a front wheel;

a tow bar; and coupling means for alternatively attaching one of the front wheel and the tow bar to the base frame, said coupling means including means operable to permit pivoting of the front wheel from an operable position wherein the front wheel is extended from the base frame, to a collapsed position wherein the front wheel is disposed in juxtaposition to the base frame.

* * * * *